United States Patent
DelSordo et al.

(10) Patent No.: US 10,911,838 B2
(45) Date of Patent: Feb. 2, 2021

(54) MECHANISM FOR TRANSFERENCE OF MEDIA META-DATA

(71) Applicant: ARRIS Enterprises, Inc., Suwanee, GA (US)

(72) Inventors: Christopher S. DelSordo, Souderton, PA (US); Albert F. Elcock, West Chester, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 14/574,626

(22) Filed: Dec. 18, 2014

(65) Prior Publication Data

US 2016/0182939 A1    Jun. 23, 2016

(51) Int. Cl.

| H04N 21/81 | (2011.01) |
|---|---|
| H04N 21/845 | (2011.01) |
| H04N 21/41 | (2011.01) |
| H04N 21/414 | (2011.01) |
| H04N 21/23 | (2011.01) |
| H04N 21/234 | (2011.01) |
| H04N 21/40 | (2011.01) |
| H04N 21/20 | (2011.01) |
| H04N 21/21 | (2011.01) |

(Continued)

(52) U.S. Cl.
CPC ......... *H04N 21/8166* (2013.01); *H04N 21/20* (2013.01); *H04N 21/21* (2013.01); *H04N 21/214* (2013.01); *H04N 21/2223* (2013.01); *H04N 21/23* (2013.01); *H04N 21/231* (2013.01); *H04N 21/23424* (2013.01); *H04N 21/40* (2013.01); *H04N 21/41* (2013.01); *H04N 21/414* (2013.01); *H04N 21/41407* (2013.01); *H04N 21/845* (2013.01); *H04N 21/8455* (2013.01)

(58) Field of Classification Search
None
See application file for complete search history.

(56) References Cited

U.S. PATENT DOCUMENTS

| 2007/0280629 A1* | 12/2007 | Hayashi ................. H04N 5/775 386/293 |
| 2009/0007188 A1* | 1/2009 | Omernick .......... H04N 21/2402 725/62 |

(Continued)

*Primary Examiner* — Justin E Shepard
(74) *Attorney, Agent, or Firm* — Buchanan Ingersoll & Rooney

(57) ABSTRACT

The disclosed examples encompass a media sending device, a media receiving device or a method of sending and reproducing media. For example, a media sending device may store media content and a meta-data file which includes media customization information to facilitate reproduction of the media content and an identifier that identifies a type of the information in the meta-data file. The media sending device then transmits an indication to the receiving device indicating that reproduction of the media content would be facilitated by use of the information in the meta-data file. The media sending device then transfers the media content and the meta-data file to the receiving device, in response to receiving a request for the media content from the receiving device. Then, the media receiving device reproduces the media content based at least in part on information extracted from the meta-data file, in a manner indicated by the identifier.

23 Claims, 22 Drawing Sheets

(51) Int. Cl.
*H04N 21/214* (2011.01)
*H04N 21/231* (2011.01)
*H04N 21/222* (2011.01)

(56) References Cited

U.S. PATENT DOCUMENTS

| | | | |
|---|---|---|---|
| 2013/0097634 A1* | 4/2013 | Jin | G11B 27/034 |
| | | | 725/34 |
| 2013/0132509 A1* | 5/2013 | Styles | H04L 67/06 |
| | | | 709/217 |
| 2014/0029916 A1* | 1/2014 | Dhawan | H04N 9/87 |
| | | | 386/248 |
| 2014/0344876 A1* | 11/2014 | Yao | H04N 21/4307 |
| | | | 725/110 |
| 2016/0105733 A1* | 4/2016 | Packard | H04N 21/8549 |
| | | | 725/32 |

* cited by examiner

SET-TOP BOX GENERATES META DATA FILE BASED ON INSTRUCTIONS FROM CONTENT PROVIDER OR BASED ON ITS OWN DETERMINATION

SET-TOP BOX RECORDS MEDIA
(e.g. Movie in the form of an MPEG transport stream)
SUPPLIED BY THE
CONTENT PROVIDER
(e.g. Multiple Systems Operator Server)
OR THE
CONTENT CUSTOMIZATION SERVER
(e.g. NETWORK DVR)
206

↓

SET-TOP BOX GENERATES A META DATA FILE ASSOCIATED WITH THE RECORDED MEDIA BASED ON INSTRUCTIONS FROM THE CONTENT PROVIDER, OR BASED ON A DETERMINATION MADE BY THE SET-TOP BOX
208

↓

SET-TOP BOX RECIEVES REQUEST FOR THE MEDIA
(e.g. the Movie) FROM THE USER DEVICE
(e.g. the phone, the laptop, etc.)
210

↓

SET-TOP BOX SENDS:
 1) THE RECORDED MEDIA (IN THE FORM OF AN MPEG TRANSPORT STREAM),
 2) AN INDICATION THAT A META DATA FILE IS NEEDED, AND
 3) THE GENERATED META DATA FILE
TO THE USER DEVICE
212

FIG. 2B

SET-TOP BOX GENERATES META DATA FILE BASED ON INSTRUCTIONS FROM THE USER DEVICE

SET-TOP BOX RECORDS MEDIA
(e.g. Movie in the form of an MPEG transport stream)
SUPPLIED BY THE
CONTENT PROVIDER
(e.g. Multiple Systems Operator Server)
OR THE
CONTENT CUSTOMIZATION SERVER
(e.g. NETWORK DVR)
214

SET-TOP BOX RECIEVES REQUEST FOR THE MEDIA (e.g. the Movie) AND INSTRUCTIONS TO GENERATE A META DATA FILE FROM THE USER DEVICE (e.g. the phone, the laptop, etc.)
216

SET-TOP BOX GENERATES A META DATA FILE BASED ON THE INSTRUCTIONS
218

SET-TOP BOX SENDS:
 1) THE RECORDED MEDIA (IN THE FORM OF AN MPEG TRANSPORT STREAM), AND
 2) THE GENERATED META DATA FILE
TO THE USER DEVICE
220

FIG. 2C

META DATA FILE WITH TRANSITION POINTS

USER DEVICE REPRODUCES THE MEDIA BASED ON
THE TRANSITION POINTS IN THE META DATA FILE

USER DEVICE RECEIVES THE MEDIA, META-DATA FILE AND AN INDICATOR THAT THE META-DATA FILE IS USED TO FACILITATE REPRODUCTION OF THE MEDIA
410

USER DEVICE USES THE INDICATOR TO DETERMINE THAT THE META-DATA FILE WILL BE USED DURING REPRODUCTION OF THE MEDIA, AND USES THE INFORMATION OF THE META DATA FILE TO DETERMINE THAT THE INFORMATION OF THE META DATA FILE IDENTIFIES TRANSITION POINTS AND SERVICE INFORMATION FOR SWITCHING BETWEEN THE MOVIE PROGRAM STREAM AND THE ADVERTISEMENT PROGRAM STREAM
412

USER DEVICE TRANSITIONS BETWEEN THE MOVIE AND THE ADVERTISEMENT PROGRAM STREAMS AT THE IDENTIFIED TRANSITION POINTS USING THE SERVICE INFORMATION
414

FIG. 4C

META DATA FILE WITH THUMBNAIL INFORMATION

META DATA FILE WITH TRICKPLAY INFORMATION

USER DEVICE REPRODUCES THE MEDIA BASED ON THE
TRICKPLAY INFORMATION IN THE META DATA FILE

MECHANISM FOR TRANSFERENCE OF MEDIA META-DATA

TECHNICAL FIELD

The examples described herein, in general, relate to generating and transferring a meta-data file that is used for reproducing media. A sending device sends a meta-data file along with the media during the transference process. The receiving device uses the meta-data file to accurately and efficiently reproduce the media.

BACKGROUND

In recent years, accurately and efficiently transferring various types of media content between devices has become increasingly important. The transference process may include copying a media file or moving the media file from a sending device to a receiving device. In many situations, the media content is recorded on one device, and then transferred to a receiving device. In other situations, the media content is uploaded to a device, and then modified by that device before being transferred to the receiving device. In either situation, the receiving device may have difficulty accurately reproducing the media content.

For example, assume a media player tries to playback recorded audio/visual (A/V) media that the player received (that was transferred to the player) from a media store or streaming media service; and in the example, the received media content includes a recorded network program (e.g. TV show) and targeted advertisements (e.g. commercials). Transitions between the network program and the targeted advertisements may lead to reproduction problems. Specifically, the service transitions, to and from the targeted advertisements, may result in missing the beginning of the targeted advertisement, and/or missing the beginning of a section of the network program. The loss of content at transitions occurs because the media player may first have to sense program specific information (PSI), in order to accurately switch between the video packet identifiers (PID)s of the program (e.g. TV show) stream and the advertisement (e.g. commercial) stream. For example, the receiving device may need to parse the media content as it is rendering the content to find the appropriate program specific information (PSI) data. The receiving device may then need to extract the appropriate PSI information, and then apply it to the receiver hardware during the rendering process. Searching for this specific PSI data is time consuming and may result in loss of content at transitions.

SUMMARY

The following description and the accompanying drawings disclose examples of a media sending device, a media receiving device or a method of sending and reproducing media, which involves a transfer of meta-data to facilitate reproduction of the transferred media content. For example, a media sending device may store media content and a meta-data file. The meta-data file may include media customization information to facilitate reproduction of the media content on a receiving device and an identifier that identifies a type of the information in the meta-data file. The media sending device then transmits an indication to the receiving device indicating that reproduction of the media content would be facilitated by use of the information in the meta-data file. The media sending device then transfers the media content and the meta-data file to the receiving device, in response to receiving a request for the media content from the receiving device. The media receiving device then extracts the identifier from the meta-data and extracts the information in the meta-data file responsive to receiving the indication. Then, the media receiving device reproduces the media content based at least in part on the information extracted from the meta-data file, in a manner indicated by the identifier.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The figures depict one or more implementations in accordance with the present teachings by way of example only, not by way of limitation. In the figures, like reference numbers refer to the same or similar elements.

FIG. 2B is a flowchart of the operation of the set-top box in FIG. 1, when generating a meta-data file based on instructions from a content provider or based on its own determination.

FIG. 2C is a flowchart of the operation of the set-top box in FIG. 1, when generating a meta-data file based on instructions from a user device.

FIG. 4C is a flowchart for reproducing media based on the meta-data file in FIG. 4A.

DETAILED DESCRIPTION OF EXAMPLES

Figure 1:
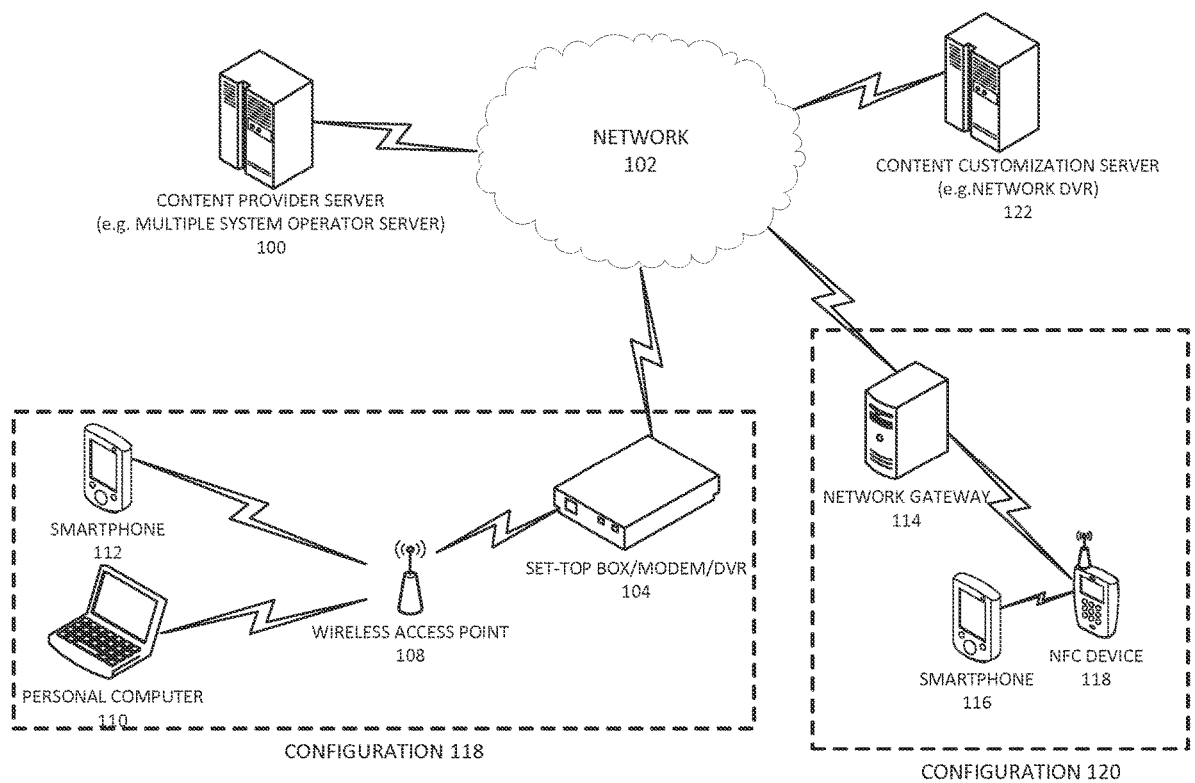
FIG. 1 is a block diagram of a system for transferring media content and meta-data files.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high level, without detailed comment in order to avoid unnecessarily obscuring aspects of the present teachings.

Transference is a term used to indicate a process by which information (e.g. media content) is transferred between a sending device and a receiving device. Transference can be the copying and/or moving of content (e.g. media) from one device to another. The transference between two or more devices can be accomplished using various communication technologies such as near field communication (NFC), WiFi, etc. In the examples described throughout the specification, the transference between the sending and receiving device includes a transfer of media content. For example, media content is recorded on one device, which operates as the sending device for further transference. From that first device, the media content is transferred to another device, i.e. the receiving device, during the transference process. Prior to the media content transference, the sending device, i.e. the device in our example that stores the media, may create or receive one or more media meta-data files associated with the media content to be transferred between the devices. This meta-data file(s) is also sent to the receiving device during transference, thereby allowing the receiving device to properly reproduce the media content based on media reproduction information stored in the meta-data file. For example, each meta data file may include media reproduction information for one or more types of reproduction (e.g. service transitions between programs, thumbnail selection, trickplay, etc.)

Media may be any one or any combination of content types transferable through a network for reproduction, such as text, audio, still images, animation, or video. Such media content is transferred, possibly recorded, and reproduced for output to users via appropriate digital media content processing devices, such as computers, mobile devices and other electronic devices. In a particular example, media content could be video (e.g. movies, TV shows, etc.) that is requested by a user for viewing. This may occur in the user's home when interacting with a cable box (e.g. set-top box). A user could request a movie from the content provider (e.g. Comcast, Verizon, etc.). In exchange for monthly payments and/or additional payments, the content provider will send the movie to the set-top box (STB) of the user. Although media content could take many other forms, the examples described throughout the description focus on video as the media content.

The meta-data file includes information to facilitate, e.g. to enhance or improve, reproduction of the media content if the information is used when the receiving device reproduces the media content. The reproduction information, and thus the meta-data file containing that information, may be associated with particular media content. More specifically, the information in a meta-data file may in some way aid in reproduction of a particular content or element(s) of the content, for example, by enabling more efficient or more accurate reproduction of content of a particular type. In one example, the meta-data file may include information used to accurately reproduce the media content for a given media reproduction scenario, e.g. identify appropriate service transition points for switching between the movie and the commercials, reproduction feature information that gives the user multiple unique reproduction options such as Fast Forward video, Rewind video, Browse thumbnails of chapters in the video, etc. Although the information in the meta-data file may take many other forms, the examples described throughout the description focus on three specific examples (e.g. identification of service transition points in the content, thumbnail information and trick play information).

In addition to the reproduction information, the meta-data file may also include an identifier. This identifier allows the receiving device to identify the type of information included in the meta-data file, e.g. determine if the information in the meta-data file is related to service transition points, thumbnails or trick play. Once the information is identified, the receiving device will know how to apply the information (i.e. how to use it) during reproduction of the media content. These identifiers could be standard identifiers used across all devices in the industry, proprietary identifiers used by certain software and hardware companies, or a combination of both. For example, if the identifiers are standard across the industry, all devices will be pre-programmed with software to know that a specific identifier (e.g. 001) identifies specific information (e.g. trickplay information) in the meta-data file. Thus, all devices will be able to identify the type of information stored in the meta-data file.

Shown in the block diagram of FIG. 1 is a system that includes two network configurations 118 and 120, which may utilize the information provided in a meta-data file to improve or otherwise facilitate reproduction of transferred media content. Each such configuration is a system or a network with at least one receiving device and at least one reproduction device, although the types of devices and/or the manner of transference between devices may vary. Other network configurations for media content transference, however, also may utilize the meta-data file to transfer reproduction.

The network configuration 118 includes a digital media content processing element connected to a content distribution network 102 (e.g. Cable TV network). The media content processing element in network configuration 118 may be an optical or cable network compatible video receiver and decoder (colloquially referred to as a "set-top box"), a modem and/or a digital video recorder (DVR) as shown generally at 104. For convenience, we will generally refer to the device 104 as a set-top box (STB). The network configuration 118 also includes a content distribution network within the customer premises. In the example, the customer premises network is wireless, as generally represented by the wireless access point 108 (e.g. WiFi access point/router); although other in-home networking technologies may be used. The network configuration 118 also includes end user devices such as a personal computer 110 and a smartphone 112. The wireless access point 108 enables the computer 110 and smartphone 112 to utilize services offered through the STB 104 and the connection of the box 104 to the network 102, such as Internet access and media content distribution.

The network configuration 120 includes a network gateway 114 that connects to the content distribution network 102 (e.g. Internet). A customer premises gateway, such as network gateway 114, is a data device that provides access between a wide area network such as 102 and a local network at the premises (for use by devices communicating through the local on-premises network). The physical link to the network 102 may be similar to that in the configuration 118, e.g. a fiber or cable link to a cable TV network. The device 114 provides routing, access and other services for the end user equipment operating at the premises. The gateway 114 may also include sufficient storage to support media content downloading operations, e.g. to obtain media content from servers or the like on the network 102, store the content and forward the content to end user devices on the premises network. The network configuration 120 also includes an near field communication (NFC) device 118 that allows the user device (i.e. the smart phone) to interact with the network gateway and request/pay for media content. A user may use their smart phone to request and receive media content from the network gateway via the NFC device which is used as a communication interface.

With respect to FIG. 1, examples will be described where the media content may be delivered to the networks 118 and 120 via content provider server 100 or content customization server 122. In one example, content provider server 100 may be a multiple system operator that transmits stored media content to the devices in networks 118 and 120. In another example, content customization server 122 may be a network based digital video recorder (DVR), that receives media content from the content provider server 100 and/or other content providing devices (not shown), and then transmits the received media content to the devices in networks 118 and 120.

It will also be described that content provider server 100, content customization server 122, STB 140 or any other sending device can customize the reproduction of media content by generating meta-data files associated with the media content and/or instruct the various devices in networks 119 and 120 to generate the customized meta-data files. It should be noted that transference of media content can occur in many different manners (e.g. from content provider server 100 to the devices in networks 118 and 120, from content customization server 122 to the devices in networks 118 and 120, from content provider server 100 to content customization server 122 and then to the devices in networks 118 and 120, etc.). In either scenario, a meta-data file will be generated to instruct the receiving device on how to reproduce the content. This is a form of media content customization, and can be performed in various manners.

For example, a user of smartphone 116 may wish to download media from content provider server 100 or content customization server 122. In this scenario, the user would place smartphone 116 in close proximity (e.g. 10 inches) to NFC device 118 so that NFC can occur between the two devices. Smartphone 116, using NFC, may request specific media (e.g. a movie) from NFC device 118. NFC device 118 may then send the request for this media to content provider server 100 or to content customization server 122 via the network gateway 114 and the network 102 (e.g. the Internet). Communications between NFC device 118 and content provider server 100 or content customization server 122 may be performed using wired communication channels (e.g. fiber optics, phone lines, cable lines, etc.) and/or wireless communication channels (e.g. WiFi).

In general, the STB 104 in configuration 118 becomes a sending device for distributing at least some media content to end user devices such as computer 110 and smartphone 112 at the premises. For media content distribution at the premises, the STB 104 receives media content from a server or the like 100 of content provider server 100 or content customization server 122 via the network 102. The media content may be recorded in the STB 104, for example, if the STB 104 is a DVR or implements a similar recording functionality. Transference of the media content may then take place between the STB 104 and a user device, such as the smartphone 112 or the personal computer 110, via wired or wireless communication (e.g. via the wireless access point 118 in our example).

As discussed in more detail later, customization of media content is performed by generating a meta-data file containing information that assists in or otherwise facilitates reproduction of particular media content. This meta-data file can be generated by the STB 104 or provided to the box 104 by content provider server 100 or content customization server 122 (i.e. any device can customize the media content for a given reproduction scenario by generating the meta-data file used for reproduction) and associated with the particular media content that is to be transferred to the end user device(s). During the transference process, the meta-data file for the particular content is also sent to smartphone 112 and/or personal computer 110 that will reproduce the particular media content. This meta-data file is then utilized by smartphone 112 and/or personal computer 110 when reproducing the media content received from the STB 104. For example, the meta-data file may include instructions for properly reproducing the media content. The information in the meta-data file may be generated based on the type of content being reproduced and based on the capabilities of the device performing the reproduction. For example, if the content being reproduced is a media program with targeted advertisements and the reproduction device includes have audio/video (A/V) decoders, packet identifiers (PID)s may be extracted and placed into the meta-data file for transitioning between the program and the target advertisements. The reproduction device would then use the A/V decoders and the PIDs to perform the transitions. In yet another example, among others, the meta-data file could be generated to include audio descriptors defining various languages, hearing/visually impaired functions to automatically select audio tracks based on user configuration preferences, as well as other information for other media content customization uses.

Similarly, in configuration 120, a network gateway 114 may also receive media content from content provider server 100 or content customization server 122 via network 102. Network gateway 114 then operates as the sending device to transfer (i.e. during transference) this media content to smartphone 116 via NFC device 118 in response to receiving a request from the smart phone via the NFC device 118 (e.g. the user engages the NFC device with the smartphone to select a movie for purchase). During the transference process of the media content (from the network gateway to the smartphone), the network gateway 114 (sending device) uses a wireless or wired communication channel to transmit the requested media content and a meta-data file associated with the media content to the NFC device 118 which acts as a middle man between the gateway and the smartphone. This meta-data file may be generated by the network gateway 114 or could have been received from content provider server 100 or the content customization server 122. In either case, the media content and the meta-data file are both transferred, via NFC device 118, to smartphone 116 (i.e. the receiving device) using NFC technology. Smartphone 116 is then able to reproduce the media content based on the information in the meta-data file.

The various examples of operations or methodologies described throughout the rest of this specification, and shown in many of the later figures refer to the configuration 118 shown in FIG. 1 where the STB 104 is the sending device and the smartphone 112 and/or personal computer 110 are examples of receiving devices. However, it should be noted that such examples would similarly apply to configuration 120 where the content provider server 100 or the content customization server 122 would be the sending device (using gateway 114 as an intermediary), and the smartphone 116 would be the receiving device. It should also be noted that in other network examples (not shown), the STB 104 and network gateway 114 may be combined into a single device (not shown). In yet another example (not shown), the STB 104 and network gateway 114 may include packet routing capabilities.

Figure 2A:
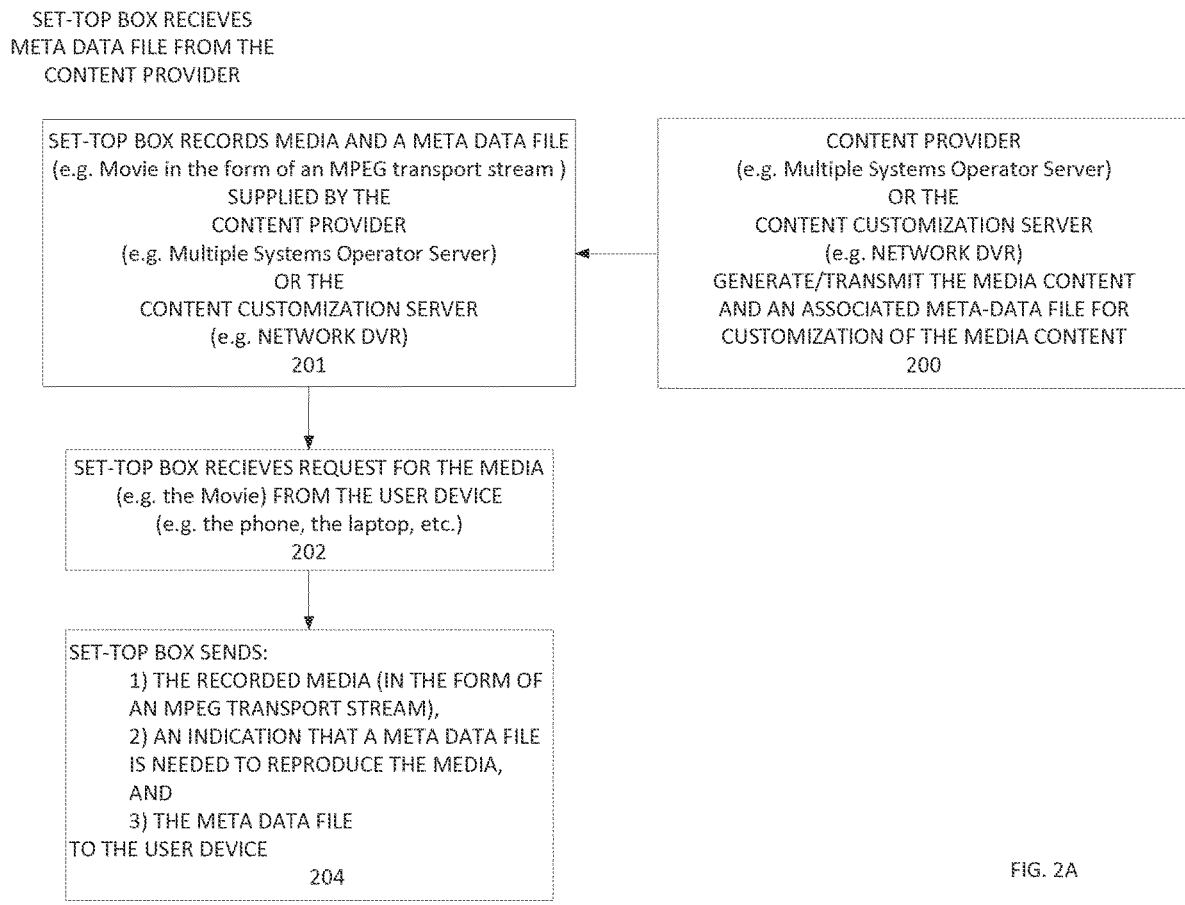
FIG. 2A is a flowchart of the operation of the set-top box in FIG. 1, when receiving a meta-data file from a content provider.

As described above, the STB 104 may receive the media content and the meta-data file from the content provider. An example of such an operation is shown in the flowchart of FIG. 2A. The STB 104 may be programmed to receive and record streaming media from a cable TV network 102, or the STB 104 may request and receive a download of specific media content, e.g. in response to a user input to the STB 104 or a request from a user terminal device such as computer 110 or smartphone 112. In step 200 the content provider server 100 or the content customization server 122 (e.g. network DVR) generate media content and an associated meta-data file to perform a specific reproduction scenario. In step 201, the STB 104 records the media content received from the content provider server 100 or the content customization server 122 as well as a meta-data file associated with the content. In this example, the meta-data file also is received from the content provider server 100 or the content customization server 122, in which case, the meta-data file has been generated by the content provider server 100 or the content customization server 122. Examples of generating the meta-data file will be described later.

In step 202, the STB 104 receives a request for the media content from a user device, that is to say, from the smartphone 112 or the laptop 110 in the configuration 118 example. In step 204, during the transference process, the STB 104 sends the recorded media content, for example, as a Moving Picture Experts Group (MPEG) transport stream. MPEG is used by way of an example, although the meta-data communication may be associated with media content in other formats. The STB 104 also sends an indication of availability that a meta-data file is available with information to assist, enhance or otherwise improve the reproduction of the media content. Examples of several ways in which the indication may indicate that reproduction of the media content would be facilitated by use of the information in the meta-data file are described below. The indication of availability advises the STB that the information in the meta-data file may be used when reproducing the media content and/or instructs the user device to utilize the information during content reproduction. The STB 104 also sends the meta-data file to the user device.

In general, the indicator is generated by the device that generates the meta-data file. The indicator indicates a relationship between a specific meta-data file(s) and a specific media content(s). It is noted that the indication may be related to a specific meta-data file. The indication may be a message transmitted from the sending device to the receiving device, instructing the receiving device to open a specific meta-data file identified by the indicator. For example, the indicator could be a message that includes a numerical ID of a specific meta-data file and a numerical ID of specific media content (e.g. an MPEG stream) that is associated with the meta-data file. For example, the indicator could indicate that that one or more meta-data file(s), including one or more reproduction option(s) (service transitions, thumbnails, trickplay, etc.) is associated with a particular media content to be reproduced. This allows the receiving device to accurately determine which meta-data file to use when reproducing the particular media content. This is especially helpful in situations where there are multiple media contents (e.g. multiple movies) and multiple meta-data files respectively associated with the different movies.

As mentioned with respect to FIG. 1, the STB 104 (i.e. the sending device) may also generate the meta-data file rather than receiving the meta-data file from the content provider server 100 or the content customization server 122. This operation is shown in the flowchart of FIG. 2B. Specifically, as shown in FIG. 2B, the meta-data file is generated by the STB 104 based on a determination made by the STB 104. Specifically, in step 206, the STB 104 may record the media content supplied by the content provider server 100 or the content customization server 122, in a manner similar to that in the previous example. The STB 104 may then generate the meta-data file that is associated with the received media content. Generation of the meta-data file in the STB 104 may be based on predetermined instructions supplied by the content provider server 100 or the content customization server 122, e.g. instructions on when to generate a meta-data file and how to generate a meta-data file. As another example, the STB 104 may generate the meta-data file based on a determination made by the STB 104 itself (e.g. the STB 104 may include software to determine when a meta-data file is beneficial for reproducing the media content). For example, the STB 104 may be able to identify certain movies and TV shows where meta-data would beneficial during reproduction. Some movies may be given meta-data to enable the receiving device to perform trick play, whereas other movies may be more restrictive (i.e. not allowing Fast Forward or Rewind). This decision may be made by the STB 104 based on instructions received from the content provider or the content customization server. This allows the provider of the content and/or the sender of the content to customize the types of reproduction allowed/supported for particular content(s).

In step 210, the STB 104 then receives a request for the media content from the user device. In step 212, the STB 104 sends the recorded media content, the indication that the meta-data file would be useful to facilitate reproduction of the media content, and the generated meta-data file to the user device during the transference process, in a manner similar to that discussed above in the description of the flowchart in FIG. 2A.

In another example shown in FIG. 2C, the meta-data file could be generated (on-the-fly) by the STB 104 based on a request from the user device. Specifically, in step 214 the STB 104 may record the media content that is supplied by the content provider server 100 or the content customization server 122. The STB 104 may then receive requests for the media content as well as instructions to generate a meta-data file associated with the media content, from the user device. For example, the computer 110 or the smartphone 112 may instruct the STB 104 to generate a meta-data file with trick play information (i.e. the user wants to perform trickplay). In step 218, if the meta-data file with trickplay information does not already exist, the STB 104 generates an appropriate meta-data file in response to these instructions. In one example, the instructions sent to the STB 104 may indicate that the user wants to perform specific reproduction features (e.g. trick play, thumbnails, etc.) on the media content. In step 220, the STB 104 (during transference) will then send the recorded media content, the indication and the generated meta-data file to the user device 110 or 112.

Once the user device receives the media content, the indication and the meta-data file, the user device may implement the content reproduction based at least in part on the information in the meta-data file. Reproduction of the media content based on the meta-data file does not have to occur as soon as the meta-data file is received. Reproduction of the media content may occur at a later time when the user device is instructed by the user to reproduce the media content (i.e. the user wants to watch the movie). For example, when the user device is instructed to reproduce the media content, the user device retrieves the meta-data file from memory and pre-processes the information in the meta-data file to reproduce the media content.

Figure 3:
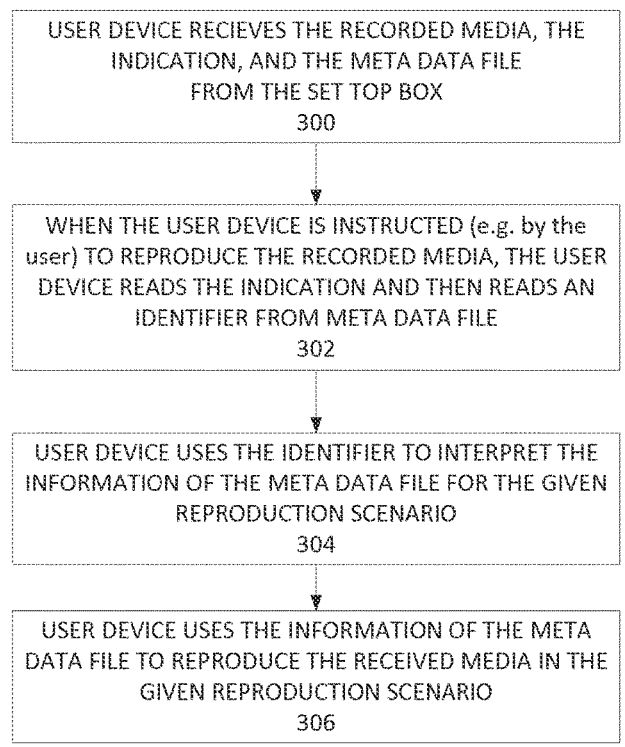
FIG. 3 is a flowchart of the user device in FIG. 1, when reproducing the media based on the meta-data file.

A general procedure of the reproduction of the media content utilizing information contained in the meta-data file is shown in the flow chart of FIG. 3. Specifically, in step 300, the user device receives the recorded media content, the indication that a meta-data file is available or may be useful for reproduction of the content, and the meta-data file from the STB 104. In step 302, when the user device is instructed (e.g. by the user) to reproduce the recorded media content, the user device will read the indication that a meta-data file is available and/or may be useful to reproduce the media content, and then will read an identifier from the meta-data file. The user device will use this identifier to interpret the information of the meta-data file in step 304.

It should be noted that the identifier (which will be described in more detail later) is a predetermined code known by both the sending device (e.g. the STB 104 in our example) and the receiving device (i.e. the mobile phone 112 or the computer 110 in the example configuration 118). Essentially, the receiving device uses the identifier, which is included as part of the information in the meta-data file, to identify the type of information in the meta-data file. In one example, identifier identifies the information of the meta-data file as being of a type indicating service transition points in the media content for targeted advertisements. Once the user device extracts the identifier from the information contained in meta-data file, the user device will utilize the information in the meta-data file to reproduce the received media content (see step 306). Different types of reproduction information, indicated by different identifiers from meta-data files, may be used in different ways during reproductions of various transferred media contents.

Figure 4A:
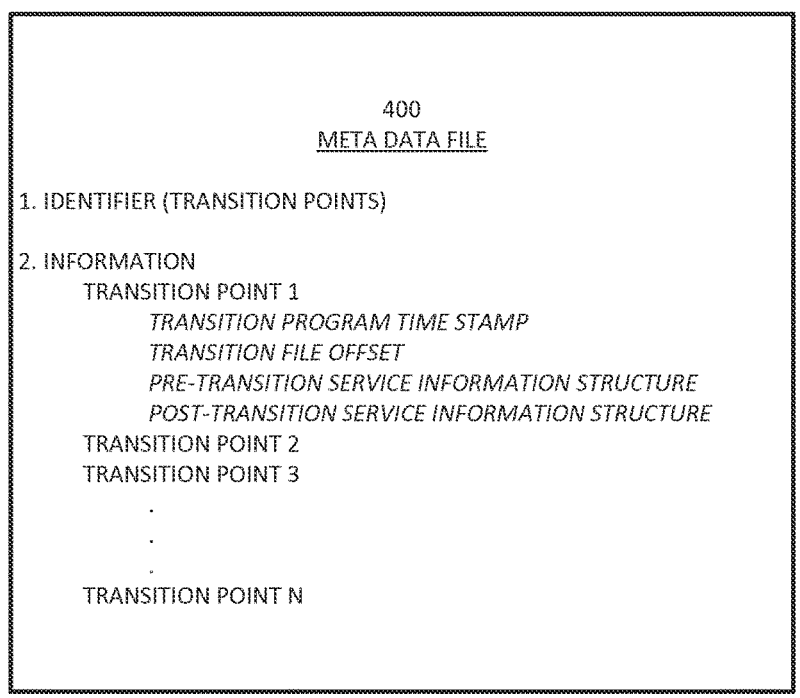
FIG. 4A shows an example of a meta-data file that includes transition point information.

The meta-data file may include various types of information for helping the receiving device during reproduction of the media content. In one example, media content may also include targeted advertisements. Specifically, advertisements may be played prior to, in between sections of, and/or at the end of a movie or TV show, for example. These targeted advertisements have associated service transition points when the media player function of the receiving device should switch between reproduction of the actual program (e.g. the movie or TV show) and the advertisements. Thus, the meta-data file 400 as shown in FIG. 4A may be generated to identify or otherwise indicate the transition points within the transferred media content, where the receiving device (i.e. the laptop or the smartphone) must implement a transition between reproduction of the program and reproduction of the advertisements. For example, the receiving device (i.e. the laptop or smartphone) can first scan the meta-data file that is associated with the media content and extract PID information. This PID information, and possibly the program service information, allows the receiving device to know exactly where to perform the transitions while rendering the content without parsing the media content itself. These transitions points are illustrated as transition point 1 to transition point N in FIG. 4A. From the information in the meta-data file, the receiving device will know that reproduction functions, such as content decoding, have to transition between the program and the advertisements at transition point 1, transition point 2, transition point 3, transition point N, etc. Also included in FIG. 4A is an identifier, which in this example, identifies the information in the meta-data file as relating to transition points for targeted advertisement service transitions. This allows the receiving device to properly decode the information of the meta-data file as being transition point information. For example, the receiving device will know, based on the identifier, that the meta-data file information is directed to transition points for targeted advertisements. Information for these transition points include specific frames that allow the receiving device to know when to accurately transition between the advertisements and the movie, and the information in the meta-data file allows the media play function of the receiving device to determine the transition frames in advance and perform some relevant processing in advance.

Although not shown in FIG. 4A, the meta-data file may include other information. This information could include program information relevant to consumer preferences (e.g. shopping history, lifestyle, etc.). This customer preference information may then be used to select specific advertisements for display to the user watching the program.

It is noted that each transition point 1-N may include various types of transition information for transitioning between the services. These types of transition information (as shown in FIG. 4A) may include, but are not limited to transition program time stamps (e.g. times in the video where the transition should take place), transition file offsets (e.g. frames in the video where the transition should take place), pre/post-transitional service information structures (e.g. PIDs, Video Descriptors, Audio Descriptors, Content Advisory Information, etc.), and/or any other information for performing the transition.

Figure 4B:
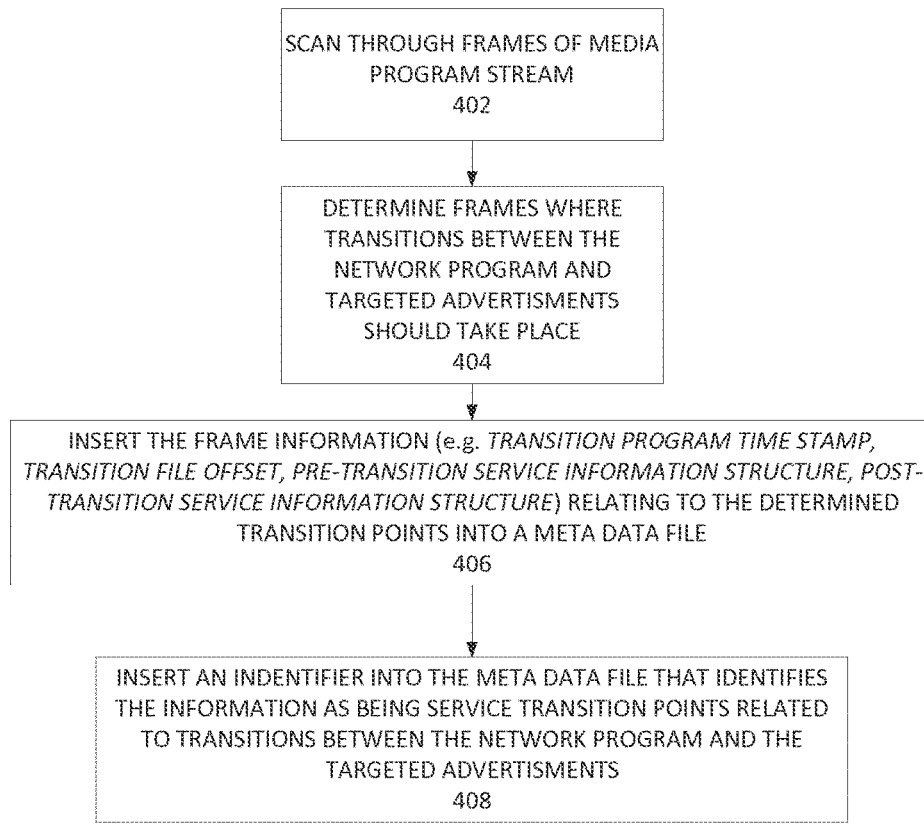
FIG. 4B is a flowchart for generating the meta-data file in FIG. 4A.

Shown in FIG. 4B is an example of a procedure to generate the meta-data file information relating to the transition points in the media content. In an example where the content is in the form of an MPEG Transport Stream, in step 402, the sending device may scan through frames of the media program stream. The sending device records the program and when it is instructed by the targeted advertisement system (not shown) to switch to/from the advertisement, the sending device adds the transition information to the meta data file(s). In step 404, the sending device may determine the frames where transitions between the program in the media content and advertisements in the media content occur. In step 406, the sending device may then insert identifications of the determined transition points into the meta-data file. Finally, in step 408, the sending device may insert the identifier into the meta-data file. The identifier identifies the meta-data file information as including the transition points extracted from the program stream.

Once the meta-data file is generated, the user device may then utilize this meta-data file to properly transition between the movie program and the targeted advertisements. Specifically, as shown in step 410 of FIG. 4C, the user device receives the media content, the meta-data file and the indicator from the sending device. In step 412, the user device uses the indicator to determine that the meta-data file will be used during reproduction of the media content, and uses the identifier to interpret that the information of the meta-data file identifies transition points for switching between the movie program stream and the advertisement program stream (e.g. by comparing the identifier to known reproduction information identifiers stored on the user device). Finally, in step 414, the user device transitions between reproduction of the movie and the advertisement program streams at the specified transition points. This insures that switching occurs at the proper point in time.

Figure 5A:
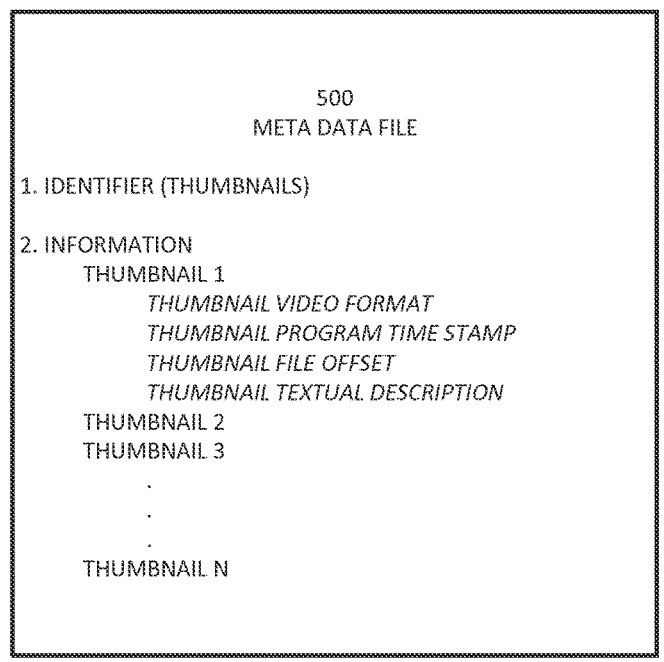
FIG. 5A shows an example of a meta-data file that includes thumbnail information.

In yet another example, as shown in FIG. 5A, the meta-data file may include thumbnail information, e.g. an image of a video frame or a reference to the video frame, which the user terminal device may display to the user to identify specific scenes in a movie or other video program. The user can scan through the thumbnails when deciding whether to begin or continue normal playback of the program (i.e. select to start the movie from a specific scene). The meta-data file in FIG. 5A is generated by the sending device to include thumbnail information, shown by way of example as thumbnail 1 to thumbnail N in the drawing. The thumbnail information in the meta-data file may be the actual thumbnails (e.g. actual images from video frames, typically at reduced size and/or resolution), or specific frame reference points (e.g. video frame numbers where the thumbnails are stored in the media content). Also contained in the meta-data file is an identifier (e.g., a numerical code) that advises the receiving device that the information of the meta-data file includes thumbnail information.

It is noted that each thumbnail entry 1-N may include various types of thumbnail information for viewing thumbnails. These types of thumbnail information (as shown in FIG. 5A) may include, but are not limited to thumbnail video format, thumbnail program time stamp (e.g. times in the video where the thumbnails exist), thumbnail file offset (e.g. frames in the video where the thumbnails exist), thumbnail textual description (e.g. text relating to the thumbnail), and/or any other information for extracting the thumbnail.

Figure 5B:
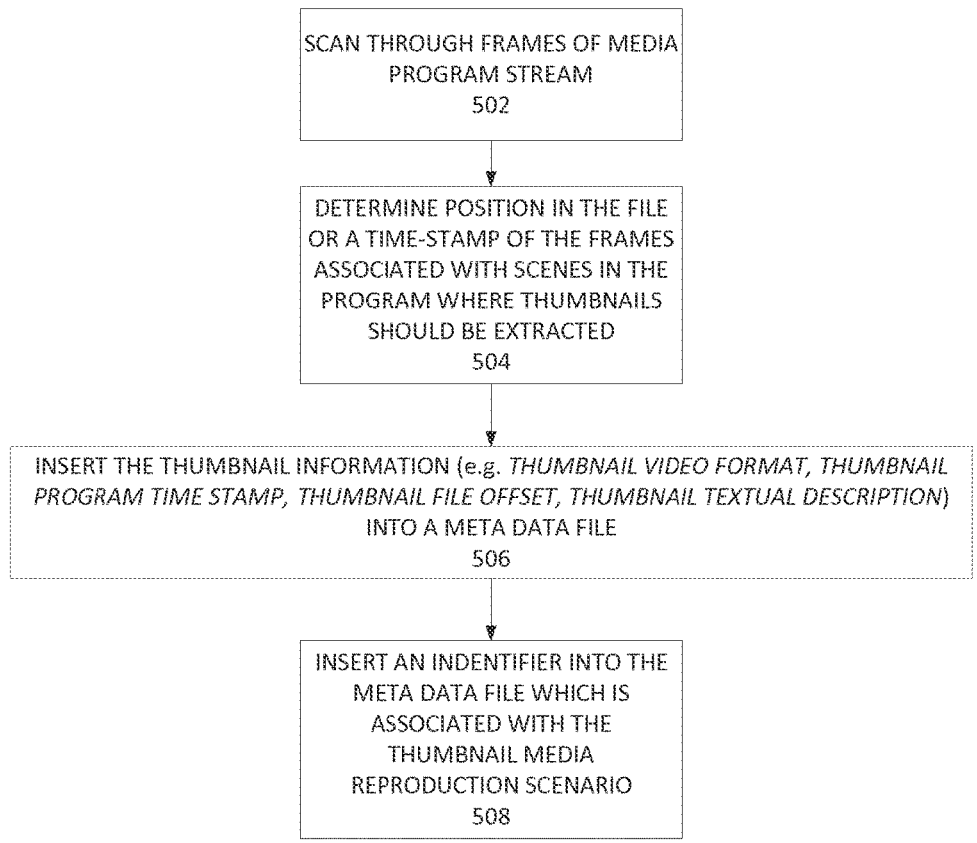
FIG. 5B is a flowchart for generating the meta-data file in FIG. 5A.

FIG. 5B shows a flowchart of a procedure for the generation of the meta-data file in FIG. 5A including the thumbnail information. Specifically, in step 502, a sending device scans through the frames in the media program stream. The sending device (in step 504) then determines frames where the thumbnail should be extracted. In step 506, the sending device inserts the thumbnail information (i.e. the actual thumbnail or a reference point to the frame in the video that may be used as the thumbnail) into the meta-data file. Finally, in step 508, the sending device inserts the identifier into the meta-data file that identifies the meta-data file information as being thumbnail information.

Figure 5C:
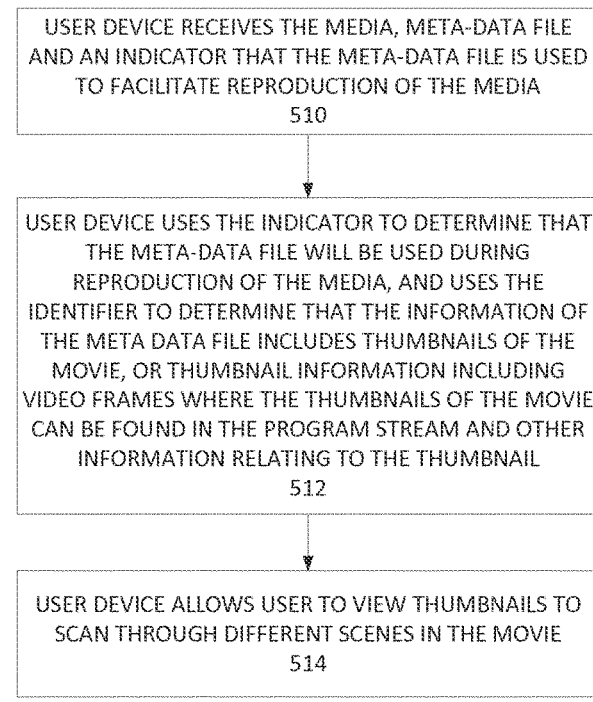
FIG. 5C is a flowchart for reproducing media based on the meta-data file in FIG. 5A.

Once the meta-data file is generated, the user device may then reproduce the media content based on the thumbnail information within the meta-data file. Specifically, as shown in step 510 of FIG. 5C, the user device receives the media content, the meta-data file and the indicator from the sending device. In step 512, the user device may use the indicator to determine that the meta-data file will be used during reproduction of the media content, and use the identifier to interpret that the reproduction information in the meta-data file includes thumbnails of the movie, or frames where the thumbnails of the movie can be found in the program stream. Finally, in step 514, the user device allows the user to view the thumbnails in order to scan through different scenes (e.g., chapters) in the movie.

Figure 6A:
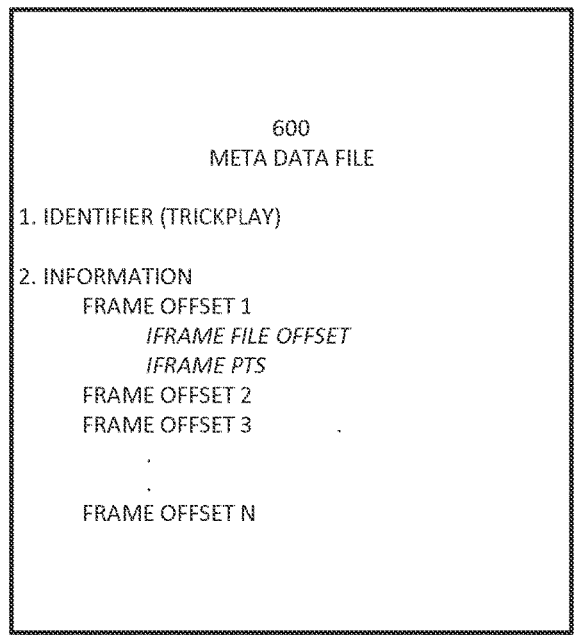
FIG. 6A shows an example of a meta-data file that includes trick play information.

In yet another example, a meta-data file (see FIG. 6A) may be generated to include trick play information. Specifically, trick play information (e.g. fast forward, rewind, etc.) allows a user to skip various frames throughout the movie in order to scan through the media content more quickly. As shown in FIG. 6A, a meta-data file may be generated to include an index file of specific frames where the receiving device can extract frames to perform one or more types of trick play functions. Specifically, the information as shown in FIG. 6A includes every eighth frame (i.e. frame 8, frame 16, frame 32, frame N, etc.). This particular example skips every eight frames, and therefore allows the user to perform an 8× fast forward or rewind trick play.

Figure 6B:
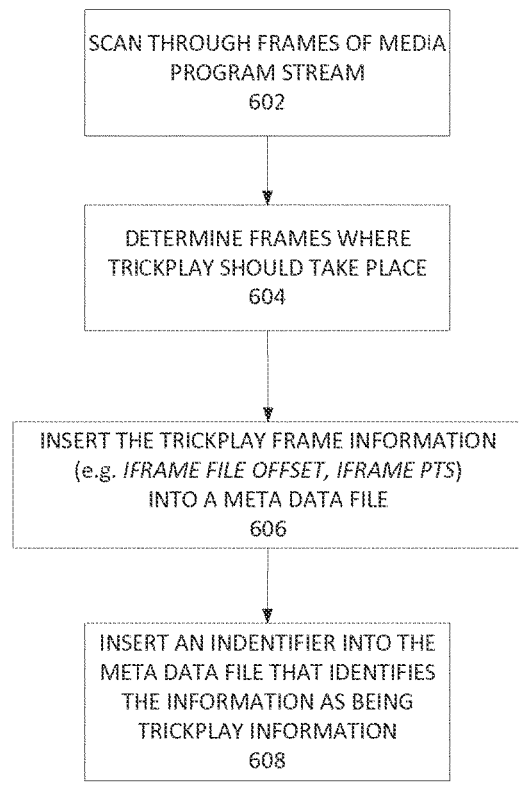
FIG. 6B is a flowchart for generating the meta-data file in FIG. 6A.

Also included in the meta-data file is an identifier that allows the sending device to know that frame numbers are trick play information. A flowchart for generating the meta file data with trick play information is shown in FIG. 6B. In step 602, the sending device scans through frames of the media program stream. In step 604, the sending device determines frames where trick play should take place. The sending device then inserts the trick play frame information into the meta-data file (see step 606). Finally, in step 608, the sending device inserts the identifier into the meta-data file that identifies the information as being trick play information.

It is noted that each trickplay entry 1-N may include various types of trickplay information for performing trickplay. These types of trickplay information (as shown in FIG. 6A) may include, but are not limited to IFrame file offset (e.g. the IFrames to display), IFrame PTS (e.g. the times where the IFrames occur), and/or any other information for performing trickplay.

Figure 6C:
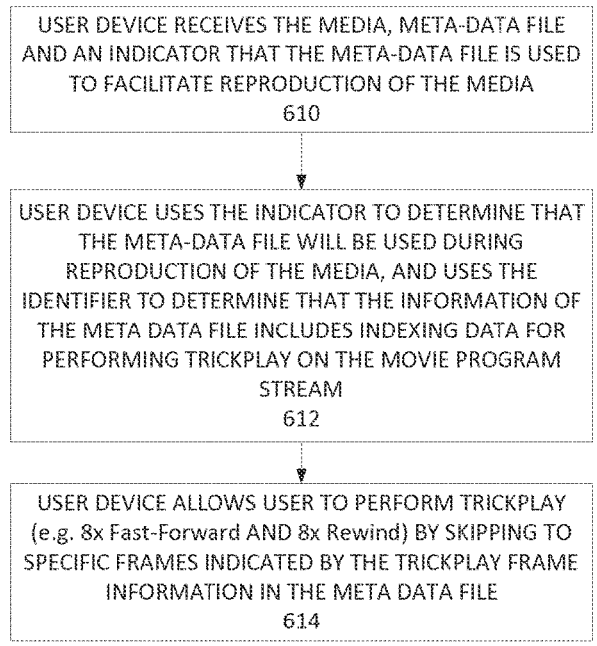
FIG. 6C is a flowchart for reproducing media based on the meta-data file in FIG. 6A.

Once the meta-data file is generated, the user device may then reproduce the media content based on the trick play information in the meta-data file (see FIG. 6C). As described in step 610, the user device receives the media content, the meta-data file and the indicator from the sending device. In step 612, the user device may use the indicator to determine that the meta-data file will be used during reproduction of the media content, and use the identifier to interpret that the information of the meta-data file includes indexing file information (e.g. frame numbers) for performing trick play on the movie program stream. Finally, in step 614, the user device may allow the user to perform the trick play by skipping the frames listed in the meta-data file.

Figure 7A:
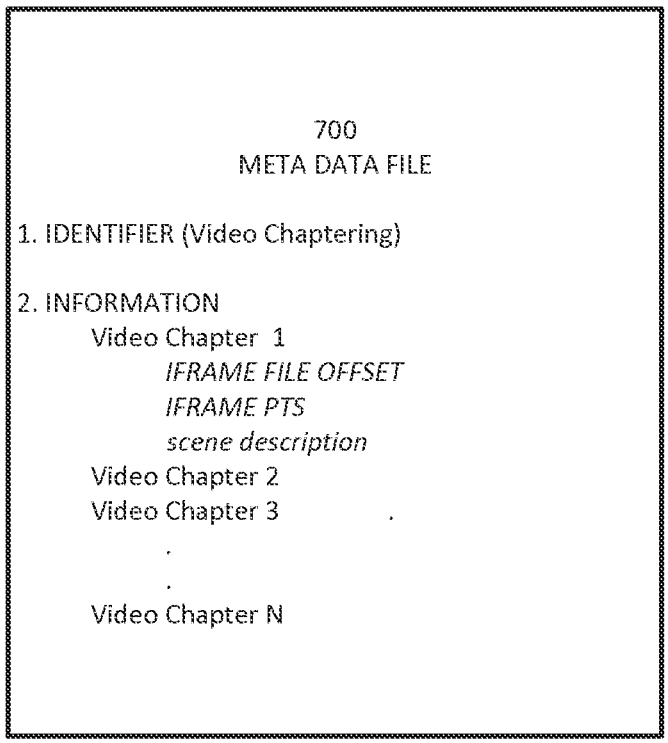
FIG. 7A shows an example of a meta-data file that includes chaptering information.

In yet another example, a meta-data file (see FIG. 7A) may be generated to include chaptering information. Specifically, chaptering information allows a user to skip various frames throughout the movie in order to skip to different points in the program (i.e. different parts of the movie). As shown in FIG. 7A, a meta-data file may be generated to include an index file of specific frames where the receiving device can extract frames to perform chaptering. Specifically, the information as shown in FIG. 7A includes every frame where a different chapter in the movie starts. Also included in the meta-data file may be scene description information. This information describes the various scenes in each of the chapters that may be selected (e.g. If the movie is a war movie, the scene description information may be "Chapter 1: Beginning of the War").

Figure 7B:
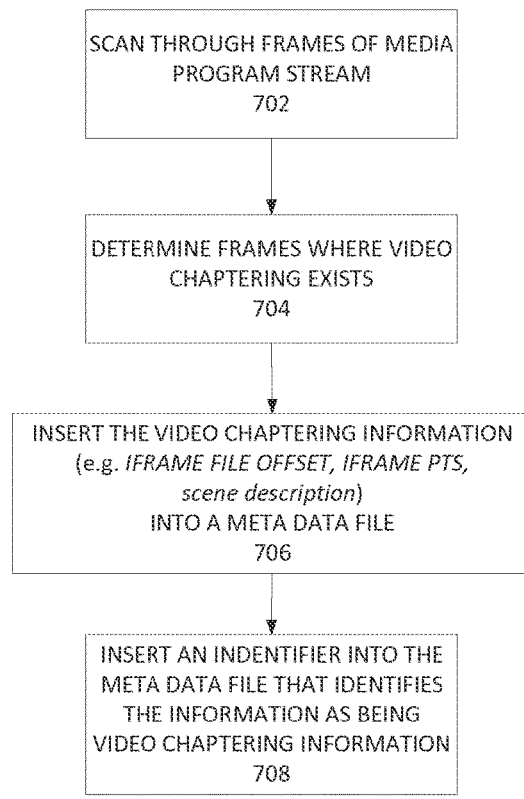
FIG. 7B is a flowchart for generating the meta-data file in FIG. 7A.

Also included in the meta-data file is an identifier that allows the sending device to know that frame numbers are chaptering information. A flowchart for generating the meta file data with chaptering information is shown in FIG. 7B. In step 702, the sending device scans through frames of the media program stream. In step 704, the sending device determines frames where chaptering should take place. The sending device then inserts the chaptering frame information into the meta-data file (see step 706). Finally, in step 708, the sending device inserts the identifier into the meta-data file that identifies the information as being chaptering information.

It is noted that each chaptering entries 1-N may include various types of chaptering information for performing chaptering. These types of chaptering information (as shown in FIG. 7A) may include, but are not limited to IFrame file offset (e.g. the IFrames to display), IFrame PTS (e.g. the times where the IFrames occur), and scene description information. For example, the customization in this scenario may be the derivation of the scene descriptions along with the file offset/program timestamp of the scene within the media content. Therefore, in one example, the meta-data could include entries such as: 1) file offset 23 program timestamp 245 "scene/chapter 1 (or name) and description", 2) file offset 445 program timestamp 1245 "scene/chapter 2/(or name) and description", 3) file offset 2445 program timestamp 16245 "scene/chapter 3/(or name) and description", up to N) file offset 332445 program timestamp 5516245 "scene/chapter n/(or name) and description". This would allow the receiving device to show descriptive information to the consumer either before or during the media reproduction stage.

Figure 7C:
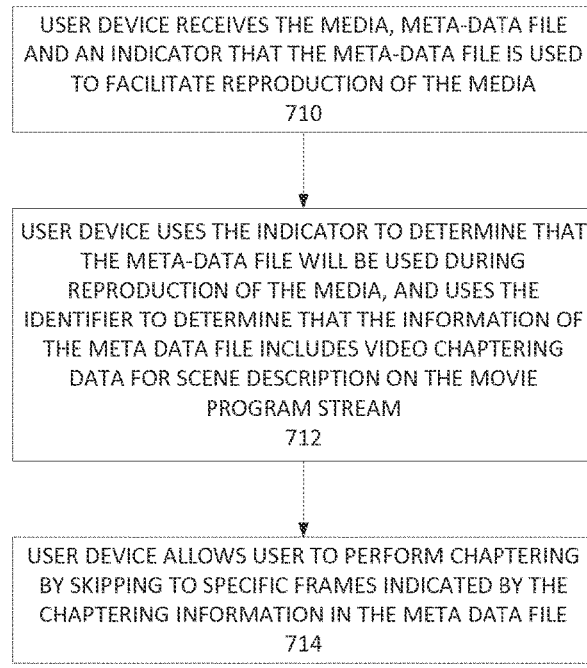
FIG. 7C is a flowchart for reproducing media based on the meta-data file in FIG. 7A.

Once the meta-data file is generated, the user device may then reproduce the media content based on the chaptering information in the meta-data file (see FIG. 7C). As described in step 710, the user device receives the media content, the meta-data file and the indicator from the sending device. In step 712, the user device may use the indicator to determine that the meta-data file will be used during reproduction of the media content, and use the identifier to interpret that the information of the meta-data file includes indexing file information (e.g. frame numbers) for performing chaptering on the movie program stream. Finally, in step 714, the user device may allow the user to perform the chaptering by skipping the frames listed in the meta-data file.

Although only four examples with respect to meta-data files were described with respect to FIGS. 4A, 5A, 6A and 7A, and with respect to network configurations 119/120 in FIG. 1, it is contemplated that any other relevant information for reproducing the media content on the receiving device may be included in the meta-data file for various other network configurations where a sending device and a receiving device would perform transference with media content and a meta-data file may be realized (i.e. different media customization scenarios may be realized in different network configurations by using different meta-data). The system and method described herein, can be applied regardless of the media customization scenario. It is also contemplated that more than one type of information may be included in a single meta-data file. For example, a single meta-data file may be generated that includes the information of meta-data files 4A, 5A, 6A and 7A. This will allow the receiving device to properly transition between the targeted advertisements and the move program, scan through the thumbnails and perform trick play. This combined meta-data file (not shown) could also include an identifier for each subsection of information (i.e. information indicating transition points would be identified by its own identifier, the thumbnails would be identified by their own identifier and finally the trick play indexes would be identified by their own identifier). The receiving device can easily scan through the meta-data file, identify the information, read the information and then perform reproduction of the media content based on this meta-data information.

Although the examples described so far were described with respect to configuration 118 in FIG. 1 (e.g. a home network configuration with a STB, cable modem or DVR), the various procedures illustrated in the flowcharts would also apply to devices in configuration 120 of FIG. 1. Specifically, configuration 120 may be implemented in a retail environment, such as a video rental kiosk or a point of sale terminal at a supermarket where the NFC device 118 and network gateway 114 are located to perform customer transactions. For example, the NFC device 118 may allow smartphone 116 users to retrieve media content (e.g., movies for rent). The movies may include advertisements that benefit from transition points as well as thumbnail information and trick play frame indexing.

Thus, the network gateway 114, for example, may generate a meta-data file that includes information about transition points, thumbnail information and/or trick play information. Then, the meta-data file, along with the media content (e.g., the movie requested by smartphone 116), may be transferred from the network gateway 114 to the NFC device 118 using wired (e.g. LAN or wireless (WiFi) communication channels). Then, the meta-data file, along with the media content (e.g., the movie requested by smartphone 116), may be transferred from the NFC device 118 to Smartphone 116 using NFC technology. Thus, the transference process would not only include transfer of the movie to the smartphone, but would also include transfer to the smartphone of the indication as well as the meta-data file utilized to reproduce the movie. At a later point in time, when the smartphone 116 is instructed by the user to reproduce the movie, the smartphone 116 will read the indication, look to the meta-data file, and utilize the information of the meta-data file to properly reproduce the media content (e.g., the movie).

In general, the various methods described throughout the specification would apply to any scenario where a sending device and a receiving device are transferring media content and reproduction may be enhanced by additional information transferred in a meta-data file to the receiving device that will ultimately reproduce the media content.

In the examples described throughout the specification and shown in the figures, the sending device and the receiving device would include software for performing the transference process. Specifically, the sending device will include software that instructs the sending device to generate and transmit the meta-data file to the receiving device. Likewise, the receiving device will also include software that will instruct the receiving device to read the meta-data file, interpret the identifier of the meta-data file and utilize the information within the meta-data file for performing reproduction of the media content. Thus, the meta-data file will have a predetermined format that, in one example, includes an information section (for listing the meta-data information used for reproduction), and an identifier section (for identifying the information in the information section). This predetermined format will be known (programed into) to both the sending device (which generates the meta-data file) and the receiving device (which decodes the meta-data file to perform reproduction).

Similarly, the sending device and/or the content provider server 100 or the content customization server 122 will include software for generating the meta-data file. In a cable TV type network example, this software may include instructions that may be defined by a multiple system operator (MSO) of the cable TV system(s). Specifically, the MSO may program instructions into the content provider server 100 or the sending device (e.g., the STB 104) so that the content provider server 100 or the content customization server 122 and/or STB 104 knows when to generate and transmit the meta-data file, and knows how to generate the meta-data file. These instructions may be based on relationships between the MSO and the receiving device (e.g., the receiving device may have a contract with the MSO for a particular service), or based on a relationship between the MSO and third party such as advertisers (e.g., advertisers that have paid for advertisement space within the media content). In either case, the content provider server 100, and/or the content customization server 122 and/or the sending device (e.g. a STB 104 or network gateway 114) will have the capability to generate and send the meta-data file to the receiving device during transference such that the receiving device may utilize reproduction assistance information from the meta-data file during reproduction of the associated media content.

Figure 8A:
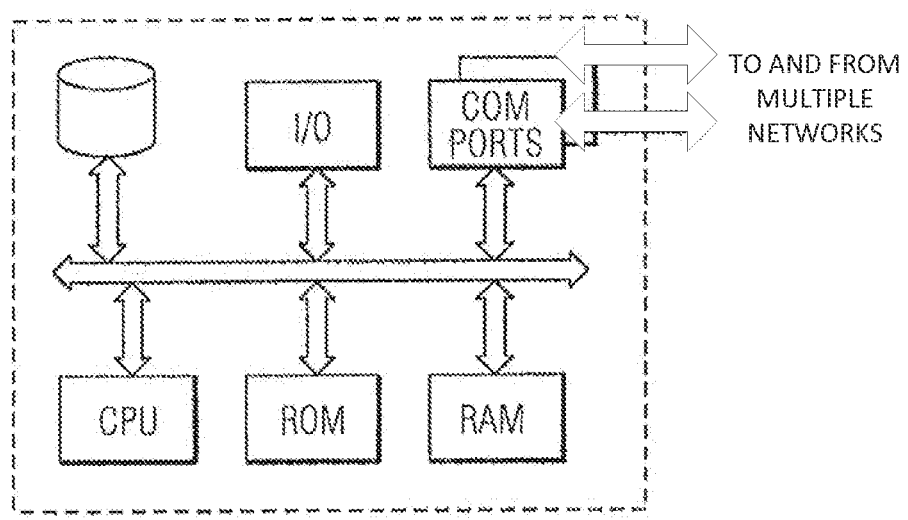
FIG. 8A shows an example of a hardware configuration of the various devices shown in FIG. 1, in simplified block diagram form.
Figure 8B:
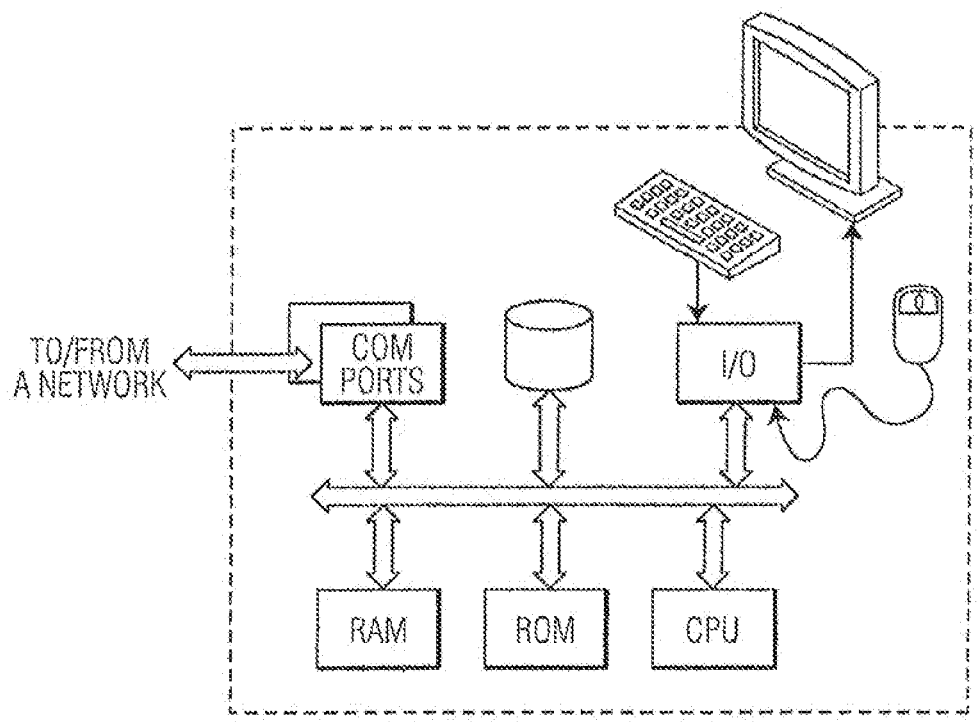
FIG. 8B shows another hardware configuration example for the various devices shown in FIG. 1, in simplified block diagram form.

FIGS. 8A and 8B provide functional block diagram illustrations of general purpose computer hardware platforms. FIG. 8A illustrates a network or host computer platform, as may typically be used to implement the at least some of the devices shown in FIG. 1, such as the network gateway 114 or the content provider server 100 or the content customization server 122. The STB 104 may be implemented in a somewhat similar fashion, although the STB 104 is typically optimized for video and related cable TV type network services or the like; and a more specific example of the STB 104 is discussed later (see FIG. 10). Also, the NFC device 118 may be implemented in a somewhat similar fashion, although the NFC device 118 is typically configured with an NFC chipset and antenna for performing NFC with the smartphone; and a more specific example of the NFC device 118 is discussed later (see FIG. 11).

FIG. 8B depicts a computer with user interface elements, as may be used to implement a personal computer or other types of a terminal device as shown in FIG. 1 (e.g. personal computer 110), although the computer of FIG. 8B may also act as a server if appropriately programmed. It is believed that the general structure and general operation of such equipment as shown in FIGS. 8A and 8B should be self-explanatory from the high-level illustrations.

In one example (e.g. FIG. 8A), a STB or network gateway could include a data communication interface for packet data communication with or through the network 102 as well as one or more communication interfaces to support local input/output functions and/or further communications with end user devices at the premises (shown as communication or "COM" ports in the drawing). The STB, for example, would have audio video outputs, a remote control input, an adapter card or interface to network 102 as well as a network interface card or the like for the local network interface connection (e.g. cable or wireless to WiFi access point 108). The STB or network gateway could also include circuits forming one or more processors forming a central processing unit (CPU), for executing program instructions. The STB or network gateway typically includes an internal communication bus, program storage and data storage for various data to be processed and/or communicated by the particular device, although the server often receives programming and data via network communications. The programming of the particular type of device includes processor instructions for performing content and meta-data file related operations attributed to the STB and the network gateway, in the examples described above. The stored data, for example, includes media content and meta-data files. The hardware elements, operating systems and programming languages of such STBs and network gateways are conventional in nature. Of course, the STB and network gateway functions may be implemented in a distributed fashion on a number of similar platforms, to distribute the processing load.

A computer type user terminal device (see FIG. 8B), such as a PC or tablet computer, for implementing PC 110, similarly includes one or more data communication interfaces (represented by COM ports), circuits forming one or more processors to implement a central processing unit (CPU) functionality, main memory and one or more mass storage devices for storing user data and the various executable programs for requesting and reproducing media content and receiving and processing indications as well as meta-data files containing information to facilitate content reproduction. A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Figure 9:
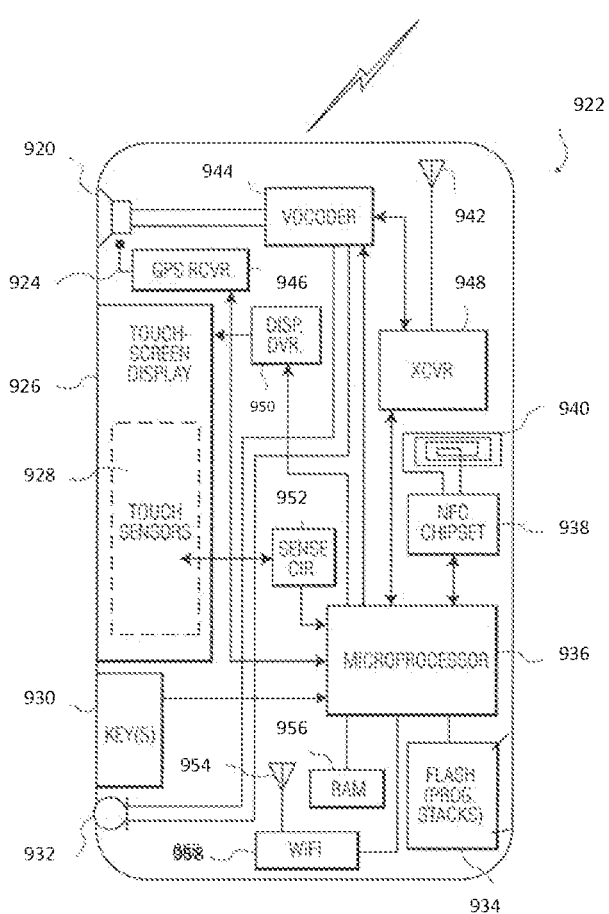
FIG. 9 shows a hardware configuration of the mobile device in FIG. 1, in simplified block diagram form.

FIG. 9 shows an example of internal components of a mobile device (e.g. a mobile device such as smartphone 112, 116, etc.) for use by a user to reproduce transferred media content, including reproduction enhanced by use of meta-data file information. It should be appreciated that communication may be performed utilizing Bluetooth communications and other communication technology standards such as NFC communication capability, mobile communication capability and other radio frequency (RF) communications.

In the example of FIG. 9, the mobile device 922 is in the form of a smartphone type mobile handset including a touch screen display. Examples of touch screen type mobile devices that may be used to implement mobile device 922 may include, but are not limited to, a smartphone, personal digital assistant (PDA), tablet computer or other portable device. The structure and operation of the touch screen type mobile device 922 is provided by way of example; although the subject technology as described herein is not intended to be limited thereto. For purposes of this discussion, FIG. 9 provides a block diagram illustration of the example of a mobile device 922 having a touch screen display for displaying content and receiving user input as or as part of the user interface.

Hence, in the example shown in FIG. 9, mobile device 922 includes a microphone 932 for audio signal input and a speaker 920 for audio signal output. The microphone 932 and speaker 924 are communicatively coupled to a voice or audio encoder/decoder (vocoder) 944. The decoder functionality and speaker may support output of reproduced audio media content.

Also, as shown in FIG. 9, the mobile device 922 includes at least one digital transceiver (XCVR) 948, for digital wireless communications via a wide area wireless mobile communication network, although the mobile device 922 may include additional digital or analog transceivers (not shown). Examples of such transceivers 948 include, but are not limited to transceivers configured to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." Transceiver 948 connects through radio frequency (RF) send-and-receive amplifiers (not separately shown) to an antenna 942. Many modern mobile devices also support wireless local area network communications over WiFi, instead of or in addition to data communications using the wide area mobile communication network. One of the smartphones in our FIG. 1 example used WiFi for media content and meta-data file transferences. Hence, in the example of FIG. 9, for packet data communications, the device 922 also includes a WiFi transceiver 958 and associated antenna 954.

Mobile device 922 further includes one or more circuit chips forming a microprocessor (or "processor") 936, which serves as a programmable controller or CPU for mobile device 922 by configuring mobile device 922 to perform various operations, for example, in accordance with instructions or programming executable by processor 936. A flash memory 934 is also used to store, for example, programming or instructions for execution by the processor 936. Mobile device 922 may also include a non-volatile random access memory (RAM) 956 for a working data processing memory.

For discussion purposes, in the smartphone example shown in FIG. 9, the user interface elements of mobile device 922 include a touch screen display 926 (also referred to herein as "touch screen 926" or "display 926"). For output purposes, the touch screen 926 will include a display screen, such as a liquid crystal display (LCD) or the like. For input purposes, touch screen display 926 includes a plurality of touch sensors 928. Other interface elements may include a keypad including one or more keys 930.

Processor 936 controls visible display output on the LCD or other display element of the touch screen display 926 via a display driver 950, to present the various visible outputs to the device user. The processor 936 may decode the media content, or the device 922 may have a video/image processor to decode media content into a format suitable for input to the driver to thereby provide content output via display 926. Some of the media content reproduction programming may cause the processor 936 to operate the driver 950 to cause screen 926 to display visible multimedia information (e.g. display the movie), for example, based on information that the processor extracts from the meta-data file.

As shown in FIG. 9, mobile device 922 also includes a sense circuit 952 coupled to touch sensors 928 for detecting the occurrence and relative location/position of each touch with respect to a content display area of touch screen display 926. The touch sensing capability, coordinated with knowledge of the information currently being displayed enables the processor to determine the nature of user inputs via the touch display, essentially, as the user directly interacts with the information displayed. Although a smartphone or the like uses this capability for a wide array of applications, the interactive input capability also may be used in relation to content reproduction, e.g. to enable a user to select content to be requested from the sending device and/or to request reproduction of previously obtained content stored in the mobile device memory.

There are also a variety of ways that a mobile device may be configured to obtain information as to current location of the device. Mobile device 922 may include global positioning satellite (GPS) receiver 926 and associated GPS antenna 924.

Mobile device 922 may also have NFC communication capability through NFC chipset 938 and associated NFC antenna 940 for communicating with NFC device 118. For example, the microprocessor 936 may control the NFC chipset to send a request for media content to the NFC device 118 via NFC antenna 940. The media content and the meta-data file may be received by the smart phone via NFC antenna 940. The media content may then be passed to microprocessor 936 via NFC chipset 938.

The NFC chipset 938 implements a low power radio frequency transceiver, which in the example is formed by the NFC chipset 938. The NFC chipset 938 connects to the NFC coil antenna 940, for transmitting and receiving NFC communications to/from other NFC compatible devices with compatible transceivers over short air link distances. The transceiver in the NFC chipset 938 and the NFC antenna 940 provide two-way wireless communication of information in accordance with NFC technology and protocols over a relatively short distances, e.g. up to 10 inches. The transceiver formed by the NFC chipset 938 sends and receives a variety of signaling messages for establishing NFC links with other NFC-enabled devices and sends and receives various user data over the established NFC links. For purposes of the present discussion, at least some of these NFC communications, e.g. with NFC device 118, relate to requesting and transferring media content and receiving meta-data files to facilitate reproduction of media contents. Although FIG. 7 shows a block diagram that could implement the various hardware devices in FIG. 1, FIGS. 10 and 11 show more specific block diagrams of the STB 104 and NFC device 118 respectively.

Figure 10:
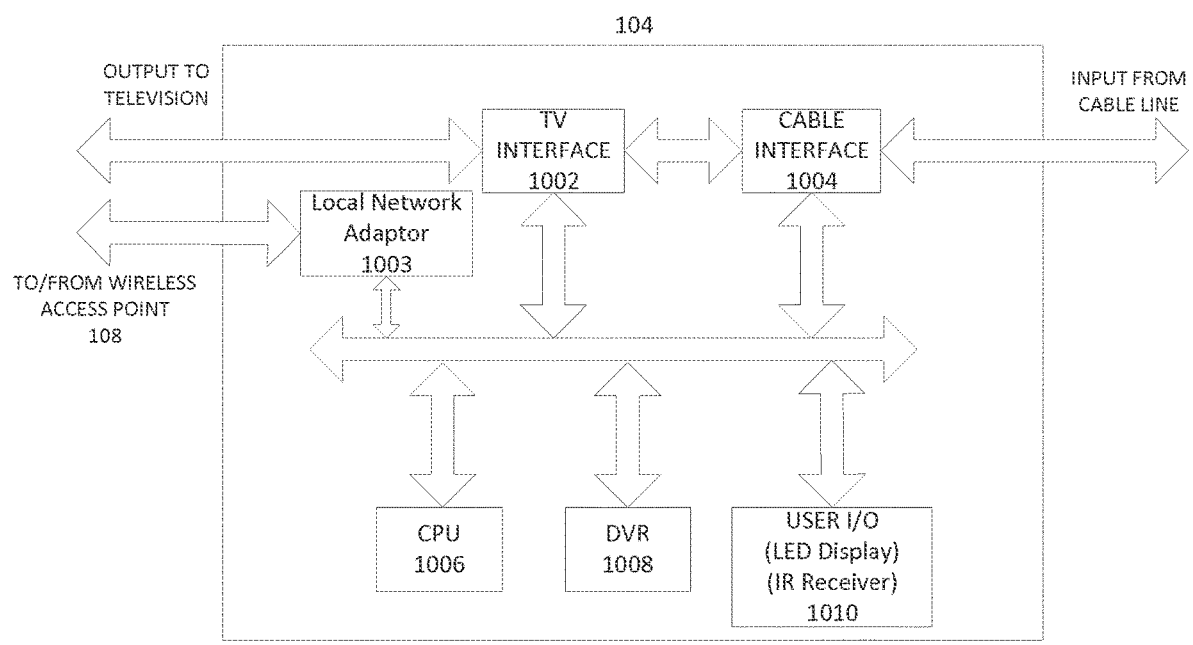
FIG. 10 shows an example of a hardware configuration for the set top box in FIG. 1, in simplified block diagram form.
Figure 11:
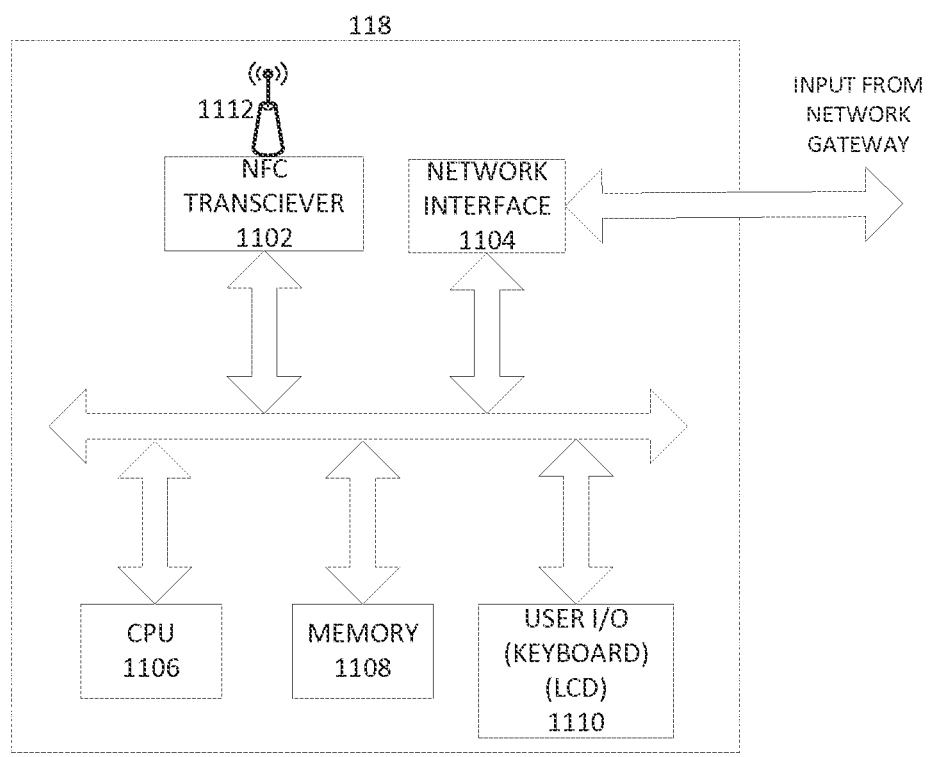
FIG. 11 shows an example of a hardware configuration for the NFC Transceiver in FIG. 1, in simplified block diagram form.

FIG. 10 shows a block diagram of an example of the STB 104. In this example, the STB 104 includes TV interface 1002 for processing data, e.g. decoding an MPEG transport stream to output visual content for displaying on a television. The STB 104 also includes an interface for local communication with end user devices, and in this example, that interface takes the form of a local network adaptor for communication to/from the wireless access point 108. The STB 104 also includes cable interface 1004 for receiving programming from the cable TV network and supplying selected MPEG transport streams to the TV interface 1002. The cable interface also sends and receives data over the network to the server to obtain the media content and possibly meta-data files or meta-data related instructions from the content provider server 100 or the content customization server 122. The STB 104 also includes circuits forming one or more processors to implement a CPU 1006 for controlling operations of the STB 104, including performing the processing of the media content and meta-data files, and digital video recorder (DVR) 1008 for storing the media content and meta-data files. Although not separately shown, the STB 104 may include one or more memories and/or other program and data storage devices, for example, for storing instructions executable by the CPU 1006. Alternatively, the media forming the storage for the DVR function 1008 may serve as the instruction storage as well. Working memories such as RAM and ROM for the CPU are omitted for convenience.

The STB 104 also includes a user I/O device 1010. The user I/O device 1010 may include a light emitting diode (LED) display for displaying information to the user watching the TV. The user I/O device 1010 may also include an infrared (IR) receiver for receiving instructions from the user's remote control.

In an example in which the smartphone 112 will be reproducing the requested content, the user may transmit, via local network adaptor 1003, a wireless signal, instructing STB 104 to retrieve media content (e.g. a TV show) from a content provider (e.g. ON-Demand Video). In response, the CPU 1006 of STB 104 (e.g. sending device) sends a request for this media content to the content server via cable interface 1004 and the cable input line. CPU 1006 may then receive the requested media content, a meta-data file associated with the media content, and an indicator indicating that the meta-data file should be utilized to facilitate reproduction of the media, from the content provider. The received media content, meta-data file and indicator are then transmitted to the smartphone 112 (e.g. the receiving device), via local network adaptor 1003. In response to receiving the indicator, the CPU of the smartphone 112 may extract the identifier from the meta-data file to identify reproduce the media content based on the information in the meta-data file.

Content may be reproduced upon receipt, or stored and reproduced at a later time. By way of an example, at a later point in time, when the user wishes to reproduce the media content on the smartphone, the smartphone sends a request for the media content to the STB 104 (now the sending device) via the WiFi access point and the local network adaptor 1003. Assuming that the STB 104 stores the requested the media content, from a previous download as discussed by way of example above, the CPU 1006 of the STB 104 retrieves the media content as well as the associated meta-data file and indicator and sends media content as well as the associated meta-data file and indicator via the local network adaptor 1003 and the WiFi access point to the smartphone. The CPU of the smartphone may then reproduce the media content based on the information in the meta-data file For example, if the meta-data file includes information on trick play (e.g. Fast Forward and Rewind), smartphone will be able to skip specific frames in the video (as instructed by the meta-data file) to allow the user to perform trick play on the video.

FIG. 11 shows a block diagram of the NFC device 118 that includes an NFC transceiver 1102 for processing NFC signals and a NFC antenna 1112 for receiving and/or transmitting NFC signals. The NFC transceiver 1102 and antenna 1112 may be implemented in a complimentary and/or similar manner as the chipset 938 and antenna 940 in the example of a mobile device of FIG. 9. For purposes of the present discussion, at least some of the NFC communications of the NFC transceiver 1102 for processing NFC signals, and NFC antenna 1112 are in a smartphone 116 for performing communications relating to media content transfers.

The NFC device 118 includes a network interface 1104 for communicating with the network gateway, for example, via a wired or wireless local area network. The NFC device 118 also includes circuits forming one or more processors to implement a CPU 1106 for controlling operations of the device, including operations for processing the media content and meta-data files. A memory device 1108 stores data to be processed by the CPU 1106, such as the media content and meta-data files. The memory device 1108 also stores programming instructions for execution by the processor(s) of the CPU 1106, including instructions controlling functions related to media transfers. The NFC device 118 may also include user I/O which could include a keypad for receiving user input and a liquid crystal display (LCD) for displaying information to the user.

In one example, the NFC device 118 may be located in a store, as a video rental/purchasing kiosk, and programmed to allow customers to purchase movies using their smartphone. A user may view the movie menu on the LCD (or possibly on their smart phone) and select the movie using the keypad (or possibly the touchscreen or the like on their smartphone). CPU 1006 of the NFC device may then request this media content (i.e. the selected movie) from the network gateway (Sending Device) via network interface 1004 and the network input line. CPU 1006 may then receive the requested media content, a meta-data file, and an indicator indicating that the meta-data file should be utilized to facilitate reproduction of the media, from the network gateway. All of this information may then be transferred to the user's smartphone (Receiving Device) via NFC transceiver 1102 and NFC antenna 1112, for example, when the user brings the smartphone within close proximity or 'bumps' the smartphone against the NFC device 118.

At a later point in time, when the user wishes to reproduce the media content (i.e. watch the TV show) on their smart phone, the smart phone may extract the identifier from the meta-data file to identify and determine how to use the information in the meta-data file. The smart phone may then reproduce the media content based on the information in the meta-data file, and output the reproduced media content to the smart phone screen. For example, if the meta-data file includes thumbnail information, the smart phone will allow the user to search through the thumbnails to find a specific scene in the movie in order to skip to a desired point in the movie.

Aspects of the methods of requesting, generating, transmitting and utilizing the meta-data files outlined above may be embodied in programming. Each of the devices (e.g. STB, Network Gateway, User Devices, Content Provider, etc.) shown in FIG. 1 may be programmed to perform the various tasks described in relation to FIGS. 2A-6C. For example, the content provider server 100 or content customization server 122 may be programmed to generate meta-data files based on the media content and/or based on the capabilities of the user device. The STB and the various user end devices may be programmed to recognize identifiers in the meta-data file and then process the media content based on the information in the meta-data file. In general, all the devices in FIG. 1 may be programmed with meta-data file capabilities (e.g. the ability to request a meta-data file, generate a meta-data file, extract information from a meta-data file and reproduce media content based on the extracted information in the meta-data file).

Program aspects of the technology may be thought of as "products" or "articles of manufacture" typically in the form of executable code and/or associated data that is carried on or embodied in a type of machine readable medium. For example, programming code could include code for the server or the sending device for generating meta-data files and programming for the receiving device for reproducing content based on the meta-data files. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider into the computer platforms of the media gateway and client device. Thus, another type of media that may bear the programming, media content or meta-data files includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed:

1. A home media device configured to receive media content from a network and provide user access to the media content, the home media device comprising:
   a network receiving port configured to receive media content from the network, wherein prior to being received by the home media device, the media content received from the network has been altered from an original program to be customized for the home media device to provide user access via a display connected to the home media device;
   a communication port configured to communicate with a user device connected to the home media device to thereby receive the media content at the user device from the network through the home media device;
   a memory device; and
   a processor coupled to the communication port to control communications, and coupled to the memory device to have access to the memory, the processor being configured to:
      store the media content in the memory device,
      store a meta-data file in the memory device for media customization, the meta-data file including information facilitating reproduction of the media content on the user device, and an identifier identifying a type of the information in the meta-data file, receive a request for the media content from the user device via the communication port, transmit an indication indicating the availability of the information in the meta-data file facilitating reproduction of the media content, to the user device via the communication port, the indication identifying a specific meta-data file associated with the media content file, and transfer the media content and the meta-data file including the information facilitating reproduction of the media content from the home media device to the user device via the communication port, in response to receiving the request for the media content from the user device.

2. The home media device of claim 1, wherein the processor is further configured to:

receive, via the communication port, instructions from a content provider or from the user device, and generate the meta-data file based on the received instructions, the instructions instructing the home media device on how to generate information in the meta-data file so as to facilitate specific reproduction features of the media content.

3. The home media device of claim 1, wherein the processor is further configured to receive, via the communication port, the meta-data file from a content provider, the meta-data file being generated by the content provider based on media reproduction features supported by the content provider.

4. The home media device of claim 1, wherein the home media device is configured as a set-top box with digital video recording (DVR) capabilities, a network gateway with video recording capabilities, or a network DVR.

5. The home media device of claim 1, wherein the identifier identifies that the meta-data file includes at least one of: 1) times of targeted advertisement service transitions in the media content for switching between reproduction of a program and reproduction of advertisements included in the media content, 2) thumbnail information that includes thumbnails or identifies frames associated with thumbnails in the media content that are to be displayed by the user device to perform a specific reproduction feature of the media content, 3) frame numbers that identify frames of video to skip to in the media content for performing trick play on the media content, and 4) frame numbers that identify frames of video, and scene description information to perform chaptering on the media content.

6. The home media device of claim 1, wherein the home media device generates the meta-data file and the identifier to customize the media content to a specified reproduction scenario.

7. The home media device of claim 1, wherein the home media device stores and sends another meta-data file to the receiving device, the other meta-data file associated with at least one of the media content and another media content, and used for another media customization.

8. The home media device according to claim 1, wherein the home media device is located on the network and the communication port of the home media device is configured to communicate with the user device over the network.

9. A user device, configured to receive media content from a network through a home media device and provide user access to the media content, comprising:

a communication port configured to communicate with a home media device connected to the user device to thereby send the media content from the network to the user device;

a memory device; and a processor coupled to the communication port to control communications and coupled to the memory device to have access to the memory, the processor being configured to:

transmit, via the communication port, a request for media content to the home media device, wherein the media content has been altered from an original program to be customized for user access via a display connected to the home media device, receive playback indication indicating the availability of media customization information in a meta-data file facilitating reproduction of the media content, from the home media device via the communication port, the playback indication identifying a specific meta-data file associated with the media content file, receive the requested media content and the meta-data file from the home media device, via the communication port, responsive to the received playback indication, extract an identifier from the meta-data file identifying the type of information in the meta-data file, and extract the information facilitating reproduction from the meta-data file, and reproduce the media content based at least in part on the information facilitating reproduction extracted from the meta-data file, in a manner indicated by the identifier.

10. The user device of claim 9, wherein:

the playback indication is received, via the communication port, prior to the media content and the meta-data file being received via the communication port, and the user device uses the playback indication to identify a meta-data file associated with the media content and used for facilitating reproduction of the media content.

11. The user device of claim 9, wherein the identifier allows the user device to identify the type of meta-data information in the received meta-data file, and allows the user device to determine how to use the meta-data information to facilitate reproduction of the media content.

12. The user device of claim 9, wherein:

the user device is at least one of a smartphone or a personal computer with video recording capabilities, and the home media device is at least one of a set-top box with digital video recording (DVR) capabilities or a network gateway with video recording capabilities.

13. The user device of claim 9, wherein:

the identifier identifies that the meta-data file includes at least one of: 1) targeted advertisement service transitions that identify times for switching between a program and advertisements included in the media content, where the user device switches between the program and the advertisements according to the identified times, 2) thumbnail information that includes or identifies frames in the media content, and the user device displays the thumbnails, 3) numbers that identify frames in the media content for performing trick play on the media content, and the user device uses the frame numbers to perform the trick play, and 4) frame numbers that identify frames of video, and scene description information to perform chaptering on the media content.

14. The user device of claim 9, wherein:
the user device transmits a request for the meta-data file to the home media device, the request specifying what customization information should be included in the meta-data file.

15. The user device of claim 9, wherein:
the user device receives another meta-data file, the other meta-data file associated with at least one of the media content and another media content.

16. The home media device according to claim 9, wherein the home media device is located on the network and the communication port of the user media device is configured to communicate with the home media device over the network.

17. A method of providing media content from a home media device which is configured to receive media content from a network and provide user access to the media content, comprising:
storing, in a memory device of the home media device, media content; wherein prior to the storing, the media content has been altered from an original program to be customized for user access via a display connected to the home media device;
storing, in the memory device of the home media device, a meta-data file including information to facilitate reproduction of the media content on a user device connected to the home media device to thereby receive the media content from the network through the home media device, and an identifier identifies a type of the information in the meta-data file,
transmitting, by a processor of the home media device via a communication port of the home media device, playback indication to the user device indicating that reproduction of the media content would be facilitated by use of the information in the meta-data file, the playback indication identifying a specific meta-data file associated with the media content file, and
transferring, by the processor of the home media device via the communication port of the home media device, the media content and the meta-data file to the user device, in response to receiving a request, via the communication port, for the media content from the user device,
wherein the playback indication instructs a processor of the user device to extract the identifier from the meta-data file identifying the type of information in the meta-data file, and extract the type of information in the meta-data file, and
the user device reproduces the media content based at least in part on the information extracted from the meta-data file, in a manner indicated by the identifier.

18. The method of claim 17, further comprising:
generating, by the processor of the home media device, the meta-data file in response instructions received, via the communication port, from a content provider that provided the media content or the receiving device; or
receiving, via the communication port by the home media device, the meta-data file from a content provider that provided the media content, the content provider having generated the meta-data file.

19. The method of claim 17, wherein the identifier allows the receiving device to identify the type of information in the meta-data file and determine how to use the meta-data information to facilitate reproduction of the media content.

20. The method of claim 17, wherein:
the meta-data file is generated by a processor of the home media device to include targeted advertisement service transition information that identifies times for switching between a program and advertisements included in the media content, and
a processor of the media receiving device switches between the program and the advertisements according to the identified times.

21. The method of claim 17, wherein the meta-data file is generated by a processor of the home media device to include thumbnail information that includes or identifies frames in the media content for displaying thumbnails, and a processor of the media receiving device displays the thumbnails.

22. The method of claim 17, wherein the meta-data file is generated by a processor of the home media device to include frame numbers that identify frames in the media content for performing trick play on the media content, and a processor of the media receiving device uses the frame numbers to perform the trick play.

23. A method according to claim 17, wherein the home media device is located on the network and the communication port of the home media device is configured to communicate with the user device over the network.

\* \* \* \* \*